April 9, 1963 M. H. DIEHL 3,085,131
TRANSISTORIZED VIDEO BLACK CLIPPER
Filed Aug. 31, 1960
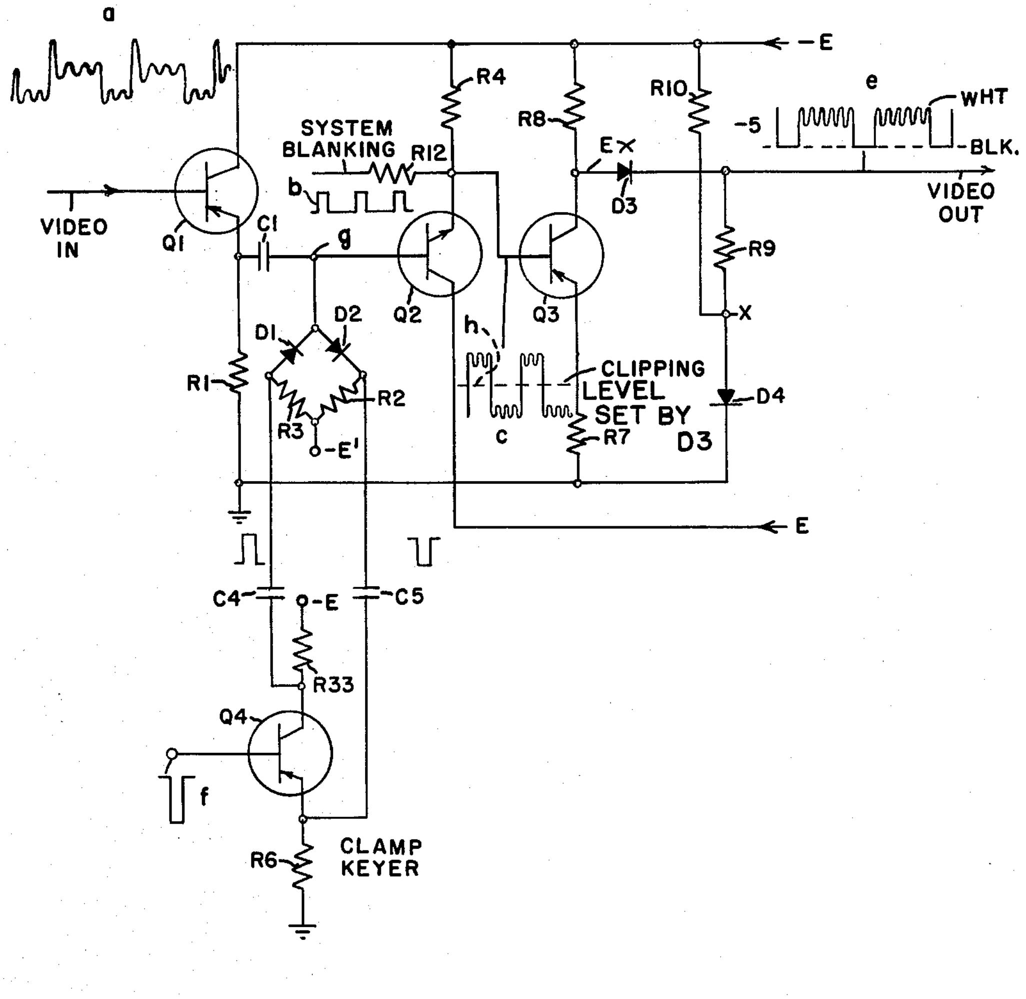
INVENTOR:
MAX H. DIEHL,
BY Joseph P. Kates
HIS ATTORNEY.

3,085,131

TRANSISTORIZED VIDEO BLACK CLIPPER

Max H. Diehl, Syracuse, N.Y., assignor to General Electric Company, a corporation of New York Filed Aug. 31, 1960, Ser. No. 53,105
4 Claims. (Cl. 178—7.1)

The present invention relates to a video black clipper and more particularly relates to a transistorized video black clipper wherein a television camera system the black level is set with a keyed clamp, the system blanking waveform is added and the combined signal is fed to a clipper and wherein the clipping point is not affected by temperature changes.

It is desirable that the black level be a smooth relatively noise free reference level in order that stray spikes will not falsely trigger the synchronizing circuit and also in order to provide a proper level which can be used as a reference for proper measurement and transmission of the combined video signal.

In providing a transistorized black clipper two major causes of clipping point drift arise. These are first, $I_{CO}$ variation with temperature, and second, variation of the emitter to base diode voltage drop with temperature. $I_{CO}$ is the symbol for the collector current of a transistor measured with the emitter open circuited. Prior art tube clippers did not have these problems.

Accordingly, an object of the present invention is to provide a composite video waveform having means for producing a noise free black level.

Another object of the invention is to provide a transistorized black level clipper circuit which compensates for variation of leakage current between the collector and base of the transistor with temperature and variation of emitter to base diode voltage drop with temperature.

Another object of the invention is to provide an output video waveform in a television camera system wherein the black level is comparatively noise free and not affected by temperature changes.

Another object of the invention is to provide a transistorized video black clipper circuit with the attendant advantages of transistorization of lower power supply drain, compactness, less necessity for service, longer life and wherein the use of transistors which normally cause drifting due to variation of $I_{CO}$ with temperature and variation of emitter to base diode voltage drop with temperature are compensated for substantially by selecting type and value of components and with a minimum of additional circuitry required.

Another object of the invention is to provide a video black clipper of simple design with no additional stages or components added to effect the required stability despite changes in ambient temperatures, and wherein the only changes in the circuitry made are those of introducing two complementary types of transistors, one compensating for the other and of selecting values and types of circuit components for these desired characteristics.

While the novel and distinctive features of the invention are particularly pointed out in the appended claims, a more expository treatment of the invention, in principle and in detail, together with additional objects and advantages thereof is afforded by the following description and accompanying drawing in which:

The FIGURE is a schematic representation of a preferred embodiment of the transistorized video black clipper circuit of the invention.

Referring to the drawing, an emitter follower video input stage, PNP transistor Q1 has a collector, a base and an emitter. Disposed between the emitter of stage Q1 and grnund is a resistor R1. An emitter follower Q2 having an emitter, a collector and a base is provided responsive to the output of stage Q1 and is coupled from stage 1 by means of "clamp coupling capacitor" C1. Disposed between the junction between clamp coupling capacitor C1 and the base of transistor Q2 is a diode bridge clamp circuit. From a reference voltage —E′, which may be made adjustable in order to enable varying of the clipping level or which may be at ground or other predetermined potential to the junction between capacitor C1 and the base of transistor Q2, a pair of branches are connected in parallel. The first parallel branch comprises a resistor R2 and a diode D2 in series. The second parallel branch comprises a resistor R3 and a diode D1. The cathode of diode D1 is connected to the junction between capacitor C1 and the base of transistor Q2. Diode D2 has its plate connected to the cathode of diode D1. Diodes D1 and D2 are selected of high conductance types. A clamp keyer transistor circuit comprises PNP transistor Q4. Transistor Q4 has a collector, a base and an emitter. Transistor Q4 supplies positive and negative clamp pulses which are supplied at a horizontal frequency rate from the synchronizing generator (not shown). Coupling capacitors C4 and C5 couple these clamp pulses to the bridge circuit. Disposed between the emitter of clamp keyer Q4 and the junction between the cathode of diode D2 and resistor R2 is a second keyer clamp coupling capacitor C5. A source of voltage —E, which may be of the order of minus twenty volts, is provided. A collector resistor R33 is disposed between the collector of transistor Q4 and source —E. An emitter resistor R6 is disposed between the emitter of transistor Q4 and ground. Positive voltage for the collector of stage Q2 is supplied by a source of positive voltage E. Source E may be an 8 volts source.

The output of transistor Q2 at its emitter is directly coupled to the base of a second PNP transistor stage Q3. Stage Q3 has an emitter, a collector and a base. A stage Q3 emitter resistor R7 is disposed between the emitter of transistor Q3 and ground. The collector of transistor Q3 is connected to the source of negative voltage —E through a collector load resistor R8. Emitter resistor R4 is disposed between the emitter of transistor Q2 and the source of negative voltage —E. Connected to the collector output of PNP transistor stage Q3 is a clipper diode D3. Disposed between the cathode of diode D3 and ground is a resistor R9 and Zener diode D4. The cathode of diode D3 is connected to the video load resistor R9. The anode of diode D3 is connected to the collector of transistor Q3. Video output is taken at the cathode of diode D3. Disposed between the connection between resistor R9 and the cathode of Zener diode D4 and the source —E is a resistor R10. Resistor R9 is of relatively small value of the order of 10% of the resistance of collector resistor R8 of transistor stage Q3. The clipper diode D3 does not clip sharply enough unless the clipper load resistor R9 is much smaller than collector load resistor R8. The reason for this is the characteristics of a diode in switching from off to on or on to off condition. A diode is a gradual switch wherein the voltage builds up on a curve. In order to sharpen this switching action, the resistor R8 acts as a relatively constant current source. In order to get sharper clipping we drive the clipper diode D3 from a relatively constant clipping source. The Zener diode provides the reference voltage which in the illustration given may be at about minus 5 volts at the junction between resistor R9 and diode D4. Resistor R10 is a bleeder resistor to bleed some current into the Zener diode to retain its reference voltage at minus 5 volts.

Operation is as follows:

Referring to the figure, the video input signal "*a*" with the noise disposed on the signal is introduced into the base of the video input stage Q1. Impedance transformation takes place in the video input stage Q1 to present a relatively low impedance to the clamp circuit. Simultaneously pulses *f* from the synchronizing generator are fed into the base of clamp keyer Q4. A pair of outputs are provided by the clamp keyer Q4. One output is taken from the emitter of the clamp keyer Q4 and is coupled through capacitor C5 to the cathode of the diode clamp D2. The other output, which is displaced in phase from the emitter output by 180° is taken from the stage Q4 collector and fed through capacitor C4 to the plate of diode D1. This applies a negative going voltage to the cathode of diode D2 and a positive going voltage to the anode of diode D1. Since this is a balanced bridge when the pulses are present the voltage at point G is at reference level. Capacitor C1 is made large and does not appreciably discharge within the time between pulses. Upon occurrence of pulses from the keyer Q4, the clamp circuit comprising D1 and D2 acts as a switch. The switch is closed at the synchronizing pulse times of waveform *f*. These are synchronized with the blanking pulses on the composite waveform at *a*. Therefore, each time that the blanking pulses occur in waveform *a*, the synchronizing pulses in waveform *f* fed in will close the switch provided by the balanced diode clamp circuit. This pulls the lower extremity or black level of the blanking pulses to the fixed voltage level of reference voltage of the balanced diode clamp. Therefore, at point *g* a steady, clamped, non-drifting, black level of the video input signal results. The clamped video input signal *a* is fed to the base of transistor stage Q2. Simultaneously the system blanking pulses *b* are fed through resistor R12 to the emitter of the NPN transistor stage Q2. The two waveforms of system blanking and clamped video input are added in the transistor stage Q2 to provide the resulting waveform *c* shown at the emitter of stage Q2. Waveform *c* is applied to the base of PNP transistor Q3 where it is further amplified and then clipped by the action of the diode D3 as shown by the clipping level dashed line *h* on the waveform *c*. The clipping action of diode D3 presents the resulting smooth reference black level shown in waveform *e* which is fed to the video output stage.

In the absence of the compensating circuit of the invention which compensates for $I_{CO}$, the collector to base leakage, this $I_{CO}$, which occurs in transistors Q2 and Q3, would gradually discharge capacitor C1 during the periods between pulse charging of capacitor C1. This would cause a sawtooth effect in the downward direction in the video signal. In order to maintain the video at approximately constant level between blanking pulses the transistor stages Q2 and Q3 are selected of opposite types. Transistor Q2 is an NPN transistor and transistor Q3 is a PNP transistor.

The variation of the emitter to base diode voltage drop with temperature is compensated for by cascading the two different types of transistors. In NPN transistor Q2 for a given collector current the emitter to base diode voltage drop becomes more negative with temperature rise while in the case of the PNP transistor Q3 becomes more positive.

At room temperature there is approximately a two-tenths of a volt drop across each of transistors Q2 and Q3. When the temperature increases substantially above room temperature the drop becomes about one-tenth of a volt across each transistor. In the case of the NPN transistor Q2 the voltage at its emitter increases with increased temperature with its base clamped at constant voltage.

In the case of PNP transistor Q3, the drop across the transistor between the base and emitter decreases the same amount. However, the emitter voltage itself has increased along with the voltage at its base which is connected directly to the emitter of the stage Q3. Therefore, with increase in temperature, for example, the base of transistor Q2 remains constant because it is clamped at a constant voltage. However, its emitter voltage goes upward in the positive direction which causes a decrease in voltage difference between the constant base and the changing emitter voltage. This changing emitter positive going voltage is coupled to the base of transistor Q3 to cause its base voltage to increase in the positive direction. Simultaneously, however, the variation in temperature causes the emitter voltage at the emitter of transistor Q3 to decrease although its base has gone more positive as by one-tenth of a volt, for example, since the base of transistor Q3 is connected to the emitter of transistor Q2. Simultaneously, the change in temperature across the input diode has reduced the difference potential between its emitter and base to cause the emitter voltage of transistor Q3 to go up the same amount of voltage as in the case of transistor Q2. Since in one transistor the voltage is changing in a positive direction and the other in a negative direction the over-all change is zero. In the NPN transistor as the temperature increases, the difference in potential between base and emitter decreases. In the PNP transistor as the temperature increases the difference in potential between base and emitter decreases.

In the use of the NPN transistor Q2 and the PNP transistor Q3, the emitter to base diode voltage drop of the two different kinds of transistors are very nearly equal but are in opposite directions to cancel out any total voltage drift with temperature.

It is important that in the period between the blanking pulses the level of the video signal remain substantially constant and that a sawtooth effect should not result. Capacitor C1, if of the size of a conventional coupling capacitor, would permit discharge between pulses to give a sawtooth effect on the total signal. In the inventive circuit capacitor C1 is made relatively large of the order of about one-half a microfarad. This is about 500 times the value used ordinarily in a vacuum tube clamp. With this large capacitance the rate of relative discharge or RC time constant for discharge of the capacitor C1 is slow with relation to the time between blanking pulses at the horizontal frequency of 15,750 cycles per second. The high capacitance of capacitor C1, which provides slow discharge time within pulses and a high charge rate at the time when pulses occur, requires that diodes D1 and D2 be a high conductance type. The large capacitance of capacitor C1 requires further a low impedance generator as is provided by the emitter followed stage Q1. The low impedance output of the clamp keyer is provided to lower the impedance of the discharge path. The clamp keyer resistances R6 and R33 are small for this reason. The transistor Q4 is selected from a type which has relatively low resistance (high current capability) on conduction. That is, the clamp keyer stage Q4 must be capable of applying large pulse current.

The video input stage Q1 is an emitter follower to present a low impedance output to capacitor C1. This continues the low impedance path necessary to speed up the rate of charge or discharge of capacitor C1 during the pulse "on" time.

While in nowise to be considered as limiting the scope of the present invention the following values may be utilized in an illustrative embodiment of the invention.

| Part: | Value or Designation |
|---|---|
| Transistor— | |
| Q1 | 2N502 |
| Q2 | 3N37 |
| Q3 | 2N502 |
| Q4 | 2N526 |
| Diode— | |
| D1 | 1N663 |
| D2 | 1N663 |
| D3 | HD2569 |
| D4 | 1N1928 |
| Capacitor— | |
| C1 mfd | .47 |
| C4 mfd | 5 |
| C5 mfd | 5 |

Resistor—

| | | |
|---|---|---|
| R1 | ohms | 4,700 |
| R2 | do | 1K |
| R3 | do | 1K |
| R4 | do | 18K |
| R6 | do | 100 |
| R7 | do | 680 |
| R8 | do | 15K |
| R9 | do | 1500 |
| R10 | do | 1800 |
| R33 | do | 100 |

Legend: Mfd.=microfarad; K=1,000.

While a specific embodiment of the invention has been shown and described, it should be recognized that the invention should not be limited thereto. It is accordingly intended in the appended claims to claim all such variations as fall within the true spirit of the invention.

What is claimed is:

1. A transistorized video black clipper circuit comprising an emitter follower responsive to composite video and blanking input signals applied to the base of said emitter follower, said signals having undesired noise at the black edge of the blanking pulses, a balanced diode clamp circuit to clamp the black level of said video input signal at a predetermined reference level, said diode clamp circuit comprising a pair of diodes of high-conductance type, a large storage capacitor connected between said follower and said clamp circuit to minimize the effect of variation in leakage current between collector and base with temperature change, a clamp keyer to key said clamp in synchronism with blanking pulses so that the black level of the blanking pulses is clamped to the reference voltage of said balanced diode clamp, said clamp keyer being a transistor selected for capability of supplying larger pulse currents, the high conductance of the diodes, low input impedance of the emitter follower and large pulse current capacity thereby providing a low resistance path for rapid charging and discharging of the capacitor so that rapid duty changes of the video signal will not change the clamping point, means for applying system blanking signals, a second transistor emitter follower having the base thereof coupled to the connection of said storage capacitor and said clamp circuit, and the emitter thereof to said last recited means to provide an added clamped video and system blanking waveform, a third transistor amplifier of type opposite to said second transistor coupled in cascade with said second transistor with the base thereof coupled to the emitter of said second transistor to compensate effects of variation of emitter to base voltage with temperature, means to clip said added waveform to provide a video output with smooth black level, said compensation for leakage collector to base current and emitter to base voltage variation preventing voltage drift of the clipping point.

2. A transistorized black clipper for use with a video signal containing short duration periodic pulses comprising a first transistor video amplifier of low output impedance base input emitter follower configuration, a second emitter follower transistor amplifier of high input impedance, a capacitor coupling the emitter of the first transistor to the base electrode of the second transistor proportioned to sustain a charge on said base electrode over the interval between pulses, a keyed balanced diode clamp coupled to said base electrode comprising a pair of semiconductor diodes, keyed during said pulses, and having a low impedance in concert with the output impedance of said first amplifier proportioned for permitting a substantial change in the charge on said capacitor during one of said pulses, a third amplifier having a transistor complementary to that of said second amplifier and having its base D.C. coupled to the emitter of said second amplifier for temperature compensation, and a semiconductor diode series clipper coupled to the collector of said third transistor referenced to a voltage source through a low impedance path, said transistor output impedance being selected large with respect to the impedances of said last recited elements for effecting positive clipping action.

3. The apparatus of claim 2 having in addition thereto means coupled to said D.C. coupling point for adding blanking pulses to the video signals present therein.

4. The apparatus set forth in claim 2 wherein said balanced clamp comprises a high current capacity transistor having a pulse supplied to the base thereof in timed relation to said pulses, and adapted to provide pulses of opposite polarities at the collector and emitter thereof, said collector being coupled to one diode and the emitter to the other diode of said balanced clamp at the respective electrodes of said diodes remote from said capacitor.

References Cited in the file of this patent

UNITED STATES PATENTS

| | | |
|---|---|---|
| 2,315,388 | Bedford | Mar. 30, 1943 |
| 2,802,118 | Simkins | Aug. 6, 1957 |
| 2,892,165 | Lindsay | June 23, 1959 |
| 2,906,817 | Kidd | Sept. 29, 1959 |
| 2,910,531 | Fathauer | Oct. 27, 1959 |
| 2,912,597 | Sziklai | Nov. 10, 1959 |
| 2,953,640 | Hellstrom | Sept. 20, 1960 |
| 2,956,179 | Yragui | Oct. 11, 1960 |

FOREIGN PATENTS

| | | |
|---|---|---|
| 1,044,870 | Germany | Nov. 27, 1958 |

OTHER REFERENCES

RCA TN No. 191, "Two Stage Coupled Amplifier," by Kidd.

RCA TN No. 381, "A Keyed D.C. Restorer Transistor Circuit," by Hannan, June 10, 1960.